United States Patent [19]
Abuyama

[11] Patent Number: 5,083,216
[45] Date of Patent: Jan. 21, 1992

[54] IMAGE FORMING APPARATUS FOR FORMING AN IMAGE ACCORDING TO MAGNIFICATION

[75] Inventor: Yasuo Abuyama, Ebina, Japan
[73] Assignee: Kabushiki Kaisha Toshiba, Kawasaki, Japan
[21] Appl. No.: 454,896
[22] Filed: Dec. 22, 1989

[30] Foreign Application Priority Data

Dec. 27, 1988 [JP] Japan .................. 63-329750
Nov. 29, 1989 [JP] Japan .................. 1-309979
Nov. 29, 1989 [JP] Japan .................. 1-309980

[51] Int. Cl.⁵ .................................................. H04N 1/40
[52] U.S. Cl. .................................................. 358/451
[58] Field of Search ............... 358/451, 448, 452, 443

[56] References Cited

U.S. PATENT DOCUMENTS

| | | | |
|---|---|---|---|
| 4,381,547 | 4/1983 | Ejiri | 358/448 |
| 4,792,856 | 12/1988 | Shiratsuchi | 358/451 |
| 4,809,345 | 2/1989 | Tabata et al. | 358/451 |
| 4,872,064 | 10/1989 | Tutt et al. | 358/451 |
| 4,930,021 | 5/1990 | Okada | 358/451 |
| 4,933,775 | 6/1990 | Shimura | 358/451 |

Primary Examiner—Jin F. Ng
Assistant Examiner—Jerome Grant, II
Attorney, Agent, or Firm—Foley & Lardner

[57] ABSTRACT

A photoelectric converter reads the image of a document line by line. A magnification setting key provided on an operation panel serves to set the copying magnification. When an enlarged magnification is set by the magnification setting key, a magnification processor produces density data of an image to be output, by means of a linear interpolation method, from the image read by the photoelectric converter. When a reduced magnification is set by the magnification setting key, the magnification processor produces density data of the image to be output, by means of a projection method, from the image read by the photoelectric converter. A thermal head transfers ink from an ink ribbon onto a sheet of paper, in accordance with the image density data output from the magnification processor.

6 Claims, 9 Drawing Sheets

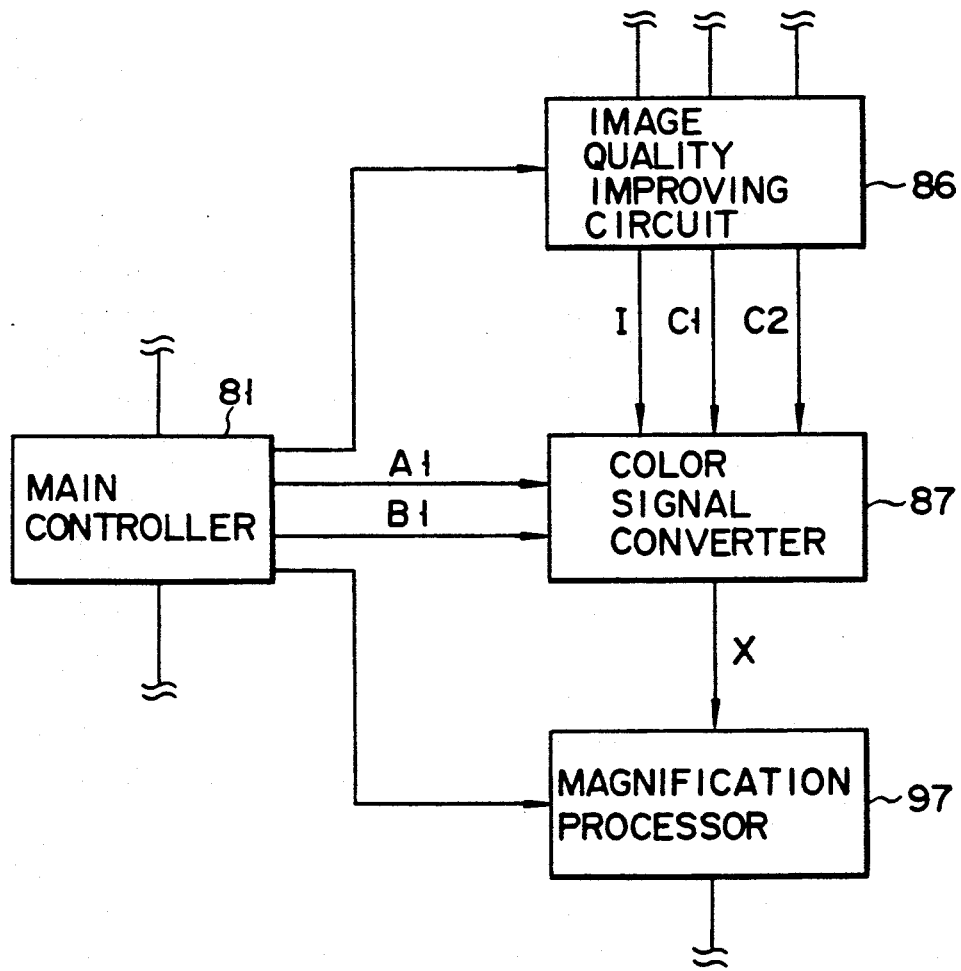
F I G. 6

IMAGE FORMING APPARATUS FOR FORMING AN IMAGE ACCORDING TO MAGNIFICATION

BACKGROUND OF THE INVENTION

1. Field of the Invention

The present invention is directed to a copying machine, and more particularly, relates to an image forming apparatus which scans the image of a document, converts it into an electric signal and forms an image on a sheet of paper, in accordance with the signal.

2. Description of the Related Art

Recently, copying machines using a thermal transfer type ink ribbon have been developed and put to practical use. These machines scan a document image by means of a CCD line sensor, quantize a signal corresponding to the document image output from the line sensor, using a digital technique, and transfer ink from an ink ribbon onto a sheet of paper, in accordance with the quantized signal.

Recently developed copying machines of this type are equipped with a magnification function for altering the magnification (reduction and enlargement) from 70 to 150% of normal size in units of 1%.

However, when magnified copies are made by such copying machines, a moire effect or the like is liable to occur, resulting in an unnaturally rendered image being printed as a consequence.

In providing enlarged copies using this type of copying machine, an image on a given dot is simply read and printed plural number of times according to the set magnification. In providing reduced copies, on the other hand, several dots of a document image are thinned out according to the set ratio of reduction. Thus, according to the above-described conventional copying machines, the density of a reduced or enlarged image at one dot position is the density of the original image itself and is not changed according to the magnification set. Consequently, even if a moire effect arising from interference between the frequency characteristic of a document image and that of the line sensor has been compensated for at the time of signal quantization, it still may occur through changing the magnification.

SUMMARY OF THE INVENTION

Accordingly, it is an object of this invention to provide an image forming apparatus which can suppress the occurrence of a moire effect or the like when the magnification is changed, thereby enabling a good-quality image to be formed.

To achieve this object, there is provided an image forming apparatus for forming an image accordance with a copying magnification, comprising:

means for reading image data on a document in units of pixels;

means for setting the magnification of an image to be formed;

means for computing pixels to be output from among those pixels which have been read by the reading means, in accordance with the magnification set by the magnification setting means, using a linear interpolation method or projection method; and means for forming an image by using the pixels computed by the computing means.

Since, in this invention, the pixel processing method is changed according to the magnification of an image to be formed, the occurrence of an undesired moire effect or the like can be suppressed irrespective of changes in the magnification, thus ensuring that a good quality image is always obtained.

BRIEF DESCRIPTION OF THE DRAWINGS

FIG. 6 is a block diagram illustrating a color signal converter shown in FIG. 5;

DETAILED DESCRIPTION OF THE PREFERRED EMBODIMENT

A preferred embodiment of this invention will now be described, referring to the accompanying drawings.

Figure 1:
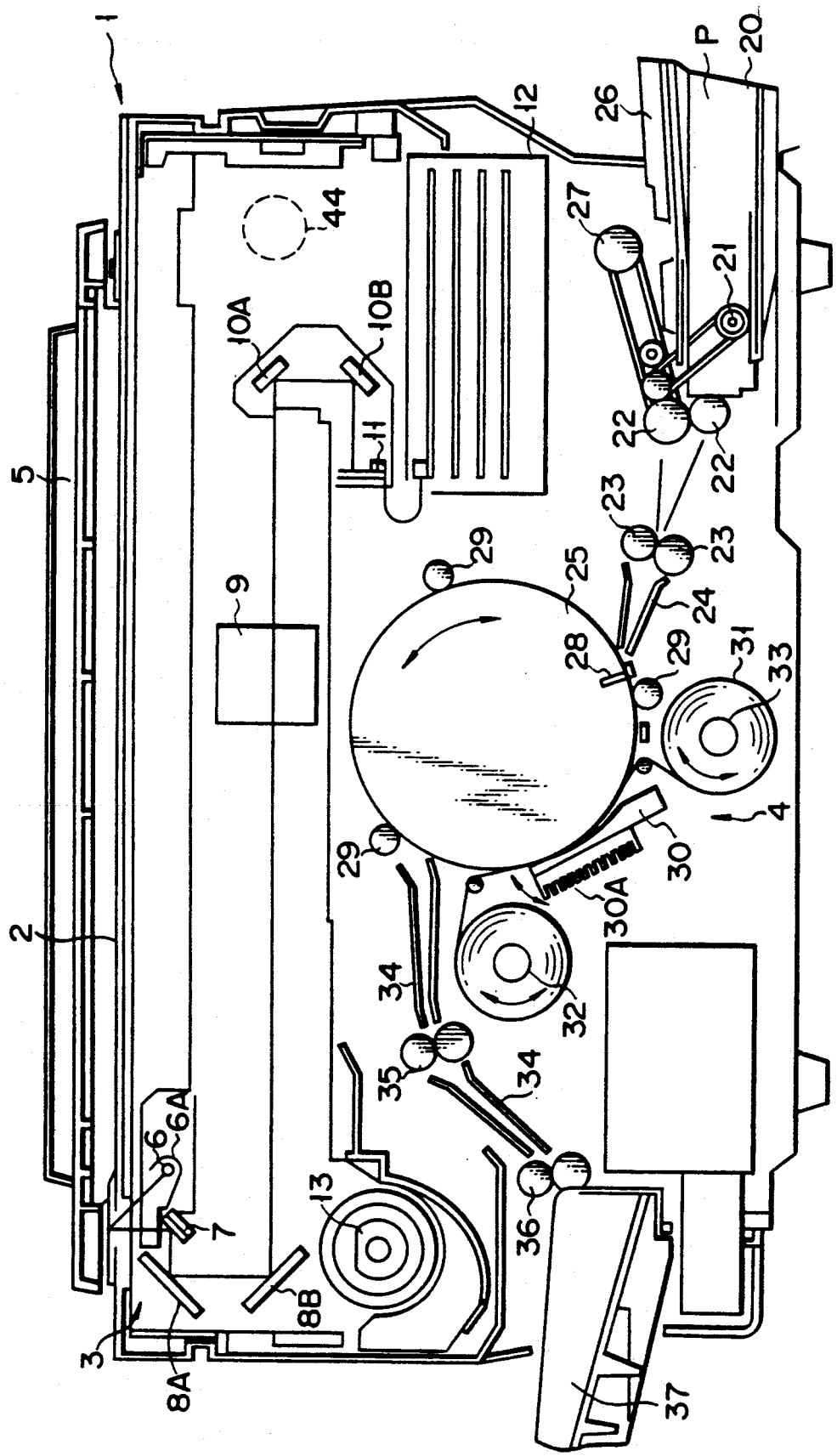
FIG. 1 is a side cross-sectional view schematically illustrating the general structure of an image forming apparatus.

FIG. 1 illustrates a digital color copying machine of a thermal transfer type which can selectively provide multi-colored copies.

At the top of a copying machine body 1 is an original table 2 made of transparent glass, and an original or a document is to be set on this original table 2. At the back side of the original table 2 are a scanner 3 for scanning the document with light to read its image and an image forming section 4 for forming an image corresponding to the scanned image of the document onto a sheet of paper. A document cover 5 for covering the original table 2 is provided on this stand in an openable/closable manner.

The scanner 3 comprises a lamp 6 as a light source, a reflector 6A, mirrors 7, 8A and 8B, a lens 9, mirror sections 10A and 10B, a photoelectric converter 11 and a fan 13. The reflector 6A irradiates light from the lamp 6 onto a document placed on the original table 2. The mirror 7 guides reflection light from the document to the mirror 8A. The mirrors 8A and 8B serve to bend a light path. The lens 9 permits light from the mirror 8B to pass through. The mirror sections 10A and 10B guide light passing the lens 9 to the photoelectric converter 11. The photoelectric converter 11 receives the reflection light from the document and converts it into an electric signal. The fan 13 serves to cool the inside of the copying machine body 1.

The output signal of the photoelectric converter 11 is supplied to a controller 12 where it is subjected to predetermined signal processing, and the resultant signal is supplied to a thermal head which will be described later.

The image forming section 4 is constituted as follows.

A sheet feed cassette 20 having sheets of paper P set therein is detachably mounted at the lower portion of the copying machine body 1. A feed roller 21, disposed close to this sheet feed cassette 20, serves to take out papers P one by one from the cassette 20. Conveying rollers 22 serve to convey a paper P fed out by the feed roller 21 toward resist rollers 23. The resist rollers 23 sets the front end of the arrived paper P straight, then feeds the paper to a platen drum via a guide 24.

A manual feed guide 26 for manually feeding a sheet of paper is provided at the top of the sheet feed cassette 20. A paper P fed through this guide 26 is conveyed to the conveying rollers 22 by a feed roller 27, and then carried to the platen drum 26 in the above-mentioned manner.

The platen drum 25 is disclosed substantially at the center of the image forming section 4. The peripheral portion of this drum 25 is made of a resilient member such as rubber. The circumference of the platen drum 25 is set slightly greater than the length of sheets of a maximum size A gripper 28 is provided at part of the platen drum 25 to hold the front end of a paper fed by the resist rollers 23. A plurality of pressing rollers 29 for pressing the paper P onto the platen drum 25 are disposed at given intervals around this drum 25.

A thermal head 30 is inclined at the lower left portion of the platen drum 25. This thermal head 30 is mounted integral with a radiating unit 30A. An ink ribbon 31 is placed between the thermal head 30 and platen drum 25, and between the ink ribbon 31 and the drum 25 comes the paper P held by the gripper 28.

Both ends of the ink ribbon 31 are wound around cores 32 and 33, respectively. These cores 32, 33 are coupled to the drive shaft of a motor (not shown) through a driving force transmission mechanism (not shown), and are rotated as needed. The ink ribbon 31 has, for example, yellow, magenta, cyan and black inks sequentially arranged. The size of each ink is set substantially equal to the maximum size of copying sheets permitted.

The thermal head 30, which is normally separated from the platen drum 25, is pressed against the drum 25 at the time of printing an image on a paper. The pressing of the head 30 presses the ink ribbon 31 against the paper P.

The paper P whose fore end held by the gripper 28 is wound around the platen drum 25 when the drum 25 rotates clockwise. When the gripper 28 passes through the thermal head 30, the head 30 is pressed against the platen drum 25 and printing starts. At this time, the ink ribbon 31 is moved so that the first color ink comes to a print start position, and the ribbon 31 is moved together with the paper P with the progress of the printing.

At the time printing using the first ink of the ink ribbon 31 is completed, the platen drum 25 has nearly made a full rotation. At this point of time, the thermal head 30 is separated from the platen drum 25, and the ink ribbon 31 is taken up so that the second ink comes to the print start position. Thereafter, the platen drum 25 is rotated clockwise again and an image is printed with the second ink on the image already formed by the first ink.

In a case of making a full-colored copy, four similar printing operations are repeated for yellow, magenta, cyan and black, or three similar printing operations for yellow, magenta and cyan. In a case of a monochromatic printing involving black, for example, the image forming is completed by one printing operation.

when predetermined printing is completed in the above manner, the platen drum 25 is rotated clockwise until the rear end of the paper P reaches a discharge guide 34. When the rear end of the paper P reaches the discharge guide 34, the platen drum 25 is rotated counterclockwise, and the rear end of the paper P is separated from the platen drum 25 by a separation gate (not shown) and guided inside the discharge guide 34. When the gripper 28 approaches the proximity of the discharge guide 34 with the rotation of the platen drum 25, the fore end of the paper P is released from the gripper 28. The paper P is then fed to a discharge tray 37 by feed rollers 35 and 36 provided at the middle portion of the discharge guide 34.

Figure 2:
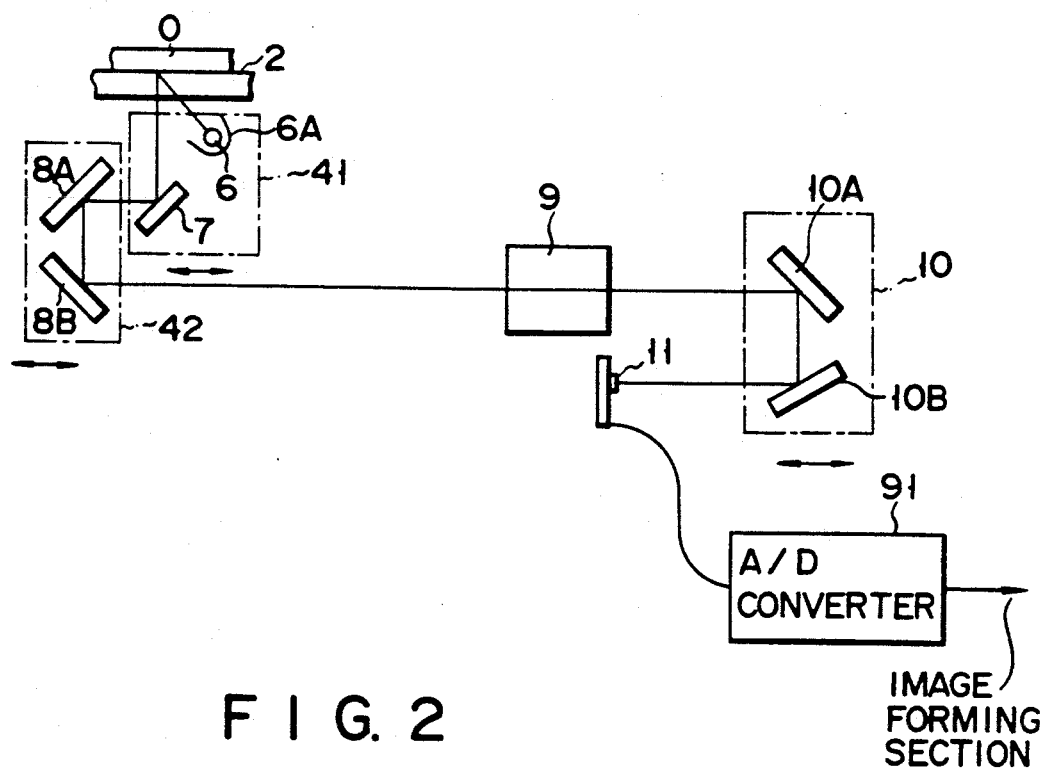
FIG. 2 is a diagram for explaining the essential section of the apparatus shown in FIG. 1.
Figure 3:
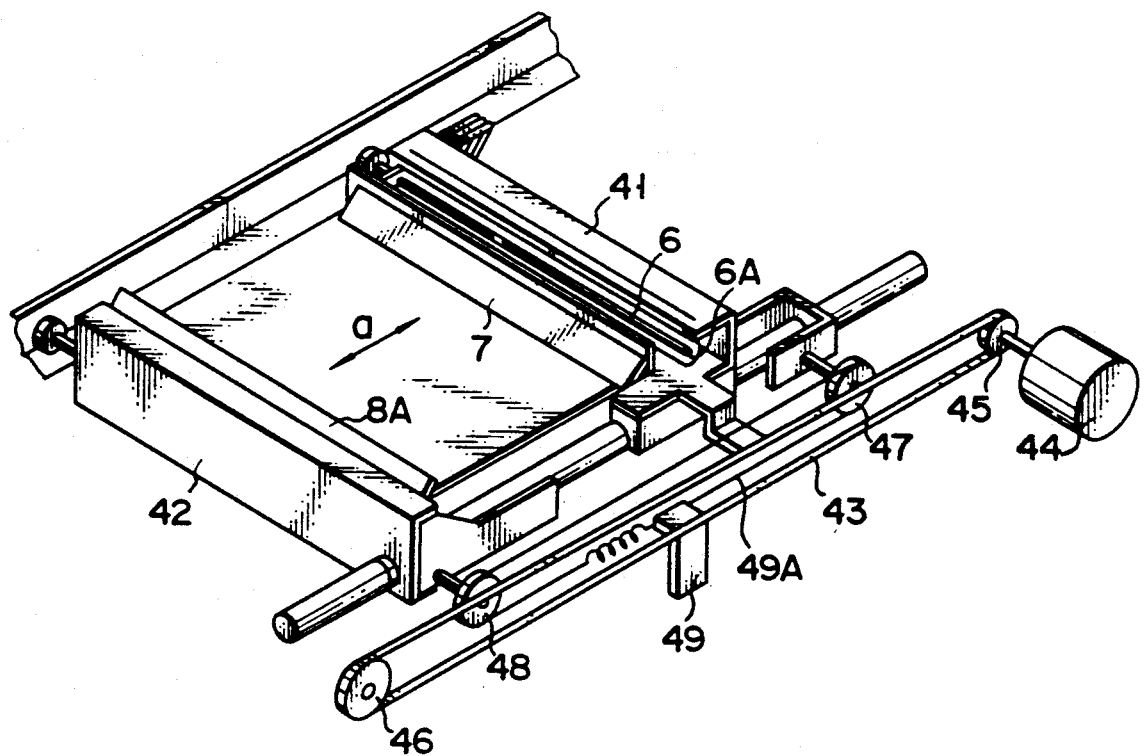
FIG. 3 is a perspective view showing part of the apparatus in FIG. 1.

FIGS. 2 and 3 illustrate the scanner 3. The lamp 6, reflector 6A and mirror 7 are provided at a first carriage 41, and the mirrors 8A and 8B at a second carriage 42. As shown in FIG. 3, the first carriage 41 is coupled to a timing belt 43 which is wound around a drive pulley 45 and an idle gulley 46. The drive pulley 45 is coupled to a stepping motor 44. The second carriage 42 is provided with a pulleys 47 and 48 around which a wire 49A is wounded. The wire 49A has both ends respectively secured to a fixing portion 49 and a middle portion secured to the first carriage 41. Accordingly, movement of the first carriage 41 causes the second carriage 42 to move in the same direction at a half the speed of the first carriage, so that image scanning can be executed with a constant length of the light path to the lens 9.

The mirrors 10A and 10B are provided on a movable frame 10 which is moved to permit the mirrors 10A, 10B to set the length of the light path corresponding to a set copying magnification when the magnification is altered.

The photoelectric converter 11 performs photoelectric conversion of the reflection light from the document O to thereby separate and extract the document image as optical color signals of cyan, green and yellow (or red, green and blue). The photoelectric converter 11 is mainly constituted by a CCD line image sensor. This sensor has cyan, green and yellow filters provided for one photoelectric converting element, three consecutive elements including cyan, green and yellow constituting one pixel. The output of the photoelectric converter 11 is sent to an A/D converter 91 to be described later.

Figure 4:
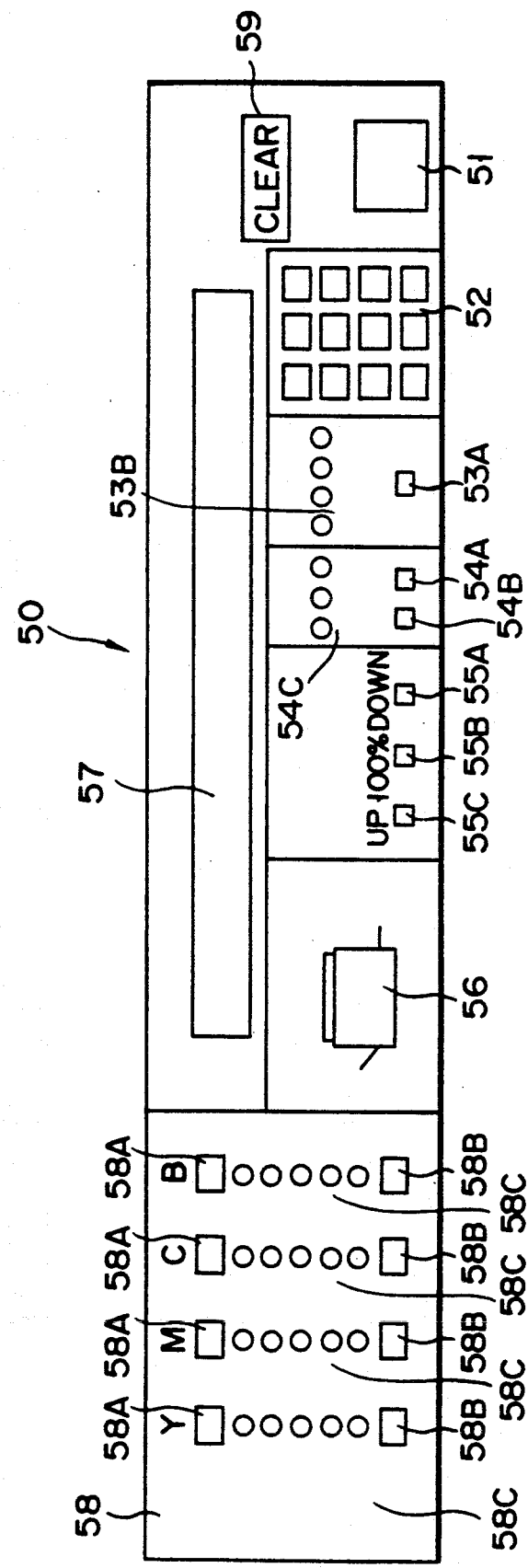
FIG. 4 is a plan view illustrating the arrangement of an operation panel.

FIG. 4 illustrates an operation panel 50 provided on the top of the copying machine body 1.

The operation panel 50 is provided with a copy key 51 for starting a copying operation, ten keys 52 for setting the number of copies to be made, a mode setting key 53A for setting a color copy mode, a monochromatic copy mode, etc., mode indicators 53B for indicating the mode set by the mode setting key 53A, density setting keys 54A and 54B for setting a copy density, density indicators 54C for indicating the copy density set by the keys 54A, 54B, a DOWN key 55A, a 100% key 55B and an UP key 55C serving as magnification setting keys to arbitrarily set a copying magnification between 70% to 400%, a jam indicator 56 for indicating where a paper is jammed, a message display section 57 for displaying the number of copies, the magnification and various messages, a color density setting section 58, and a clear key 59 for clearing various copying conditions.

The color density setting section 58, serving to set color densities for yellow y, magenta M, cyan C and black B, includes a plurality of UP color-density keys 58A for increasing the color densities for the respective colors, a plurality of color-density DOWN keys for reducing the densities of the respective colors, and a plurality of color density indicators 58C for indicating the densities of the respective colors.

Figure 5:
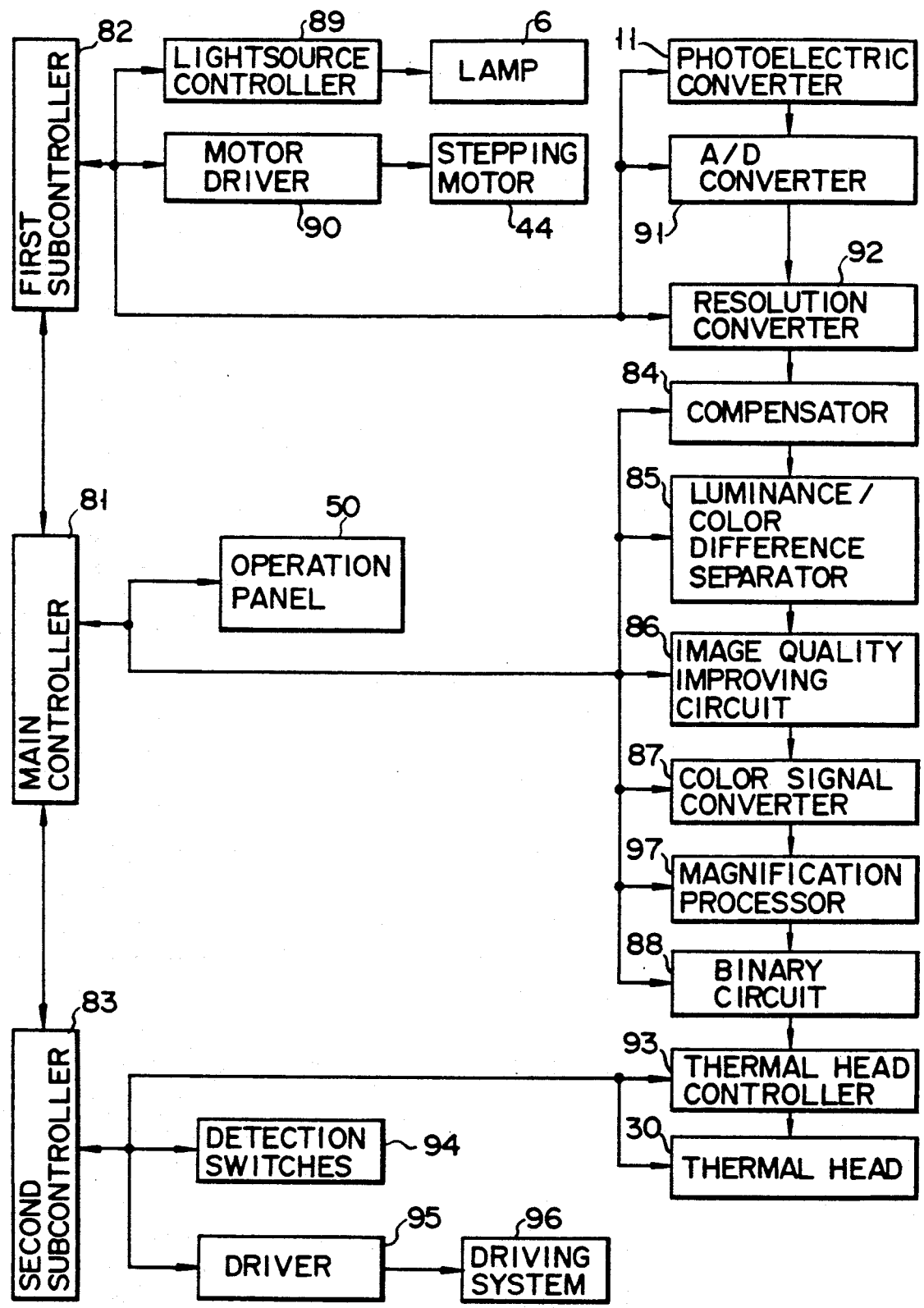
FIG. 5 is a block diagram of one embodiment of the present invention schematically illustrating the general control system.

FIG. 5 schematically illustrates the controller 12.

A main controller 81 performs the general control of the apparatus. The controller 81 is coupled with the operation panel 50, a first subcontroller 82, a second subcontroller 83, a compensator 84, a luminance/color difference separator 85, an image quality improving circuit 86, a color signal converter 87, a magnification processor 97, and a binary circuit 88.

The first subcontroller 82 is coupled with a light source controller 89, a motor driver 90, the photoelectric converter 11, the A/D converter 91 and a resolution converter 92, and controls these units.

The light source controller 89, coupled to the lamp 6, controls the switching of the lamp 6 and the amount of light therefrom when a document image is scanned.

The motor driver 90 drives the stepping motor 44.

The second subcontroller 83 is coupled with the thermal head 30, a thermal head controller 93 for controlling the temperature of this thermal head 30, various detection switches 94 and a driver 95, and controls these units.

The driver 95 is coupled to a driving system 96 for driving various motors and solenoids.

The A/D converter 91 converts an analog color signal from the photoelectric converter 11 into a digital signal and outputs it to the resolution converter 92. The converter 92 performs resolution conversion in such a way that the resolution of the photoelectric converter 11 coincides with that of the thermal head 30.

The compensator 84 executes a shading compensation to compensate for a variation in the output of the photoelectric converter 11 with respect to the individual color signals of cyan (C), green (G) and yellow (Y) from the resolution converter 92, and supplies the result to the luminance/color difference separator 85.

The separator 85 performs various arithmetic operations on the C, G and Y color signals supplied from the compensator 84 to separate a luminance signal (I), a color difference signal (C1) and a color difference signal (C2), and sends these signals to the image quality improving circuit 86.

The circuit 86 analyzes the luminance signal (I) and color difference signals (C1, C2) from the separator 85 and performs an image-quality improving process such as edge emphasizing and specifying of a character. The resultant signals are supplied to the color signal converter 87.

FIG. 6 illustrates the color signal converter 87.

This converter 87 produces color signals of yellow (Y), magenta (M), cyan (C) and black (B) corresponding to the colors of inks from the received individual signals. These color signals or density data associated with the individual colors are sequentially supplied to the magnification processor 97. The color signals Y, M, C and B to be supplied to the magnification processor 97 are selected by the main controller 81.

More specifically, the main controller 81 sends signals A1 and B1 to the color signal converter 87, and a color signal X (Y, M, C or B) is automatically selected by a combination of the signals A1 an B1 as shown in the following Table 1.

TABLE 1

| A1 | B1 | X |
|---|---|---|
| 0 | 0 | Y |
| 0 | 1 | M |
| 1 | 0 | C |
| 1 | 1 | B |

Figure 7:
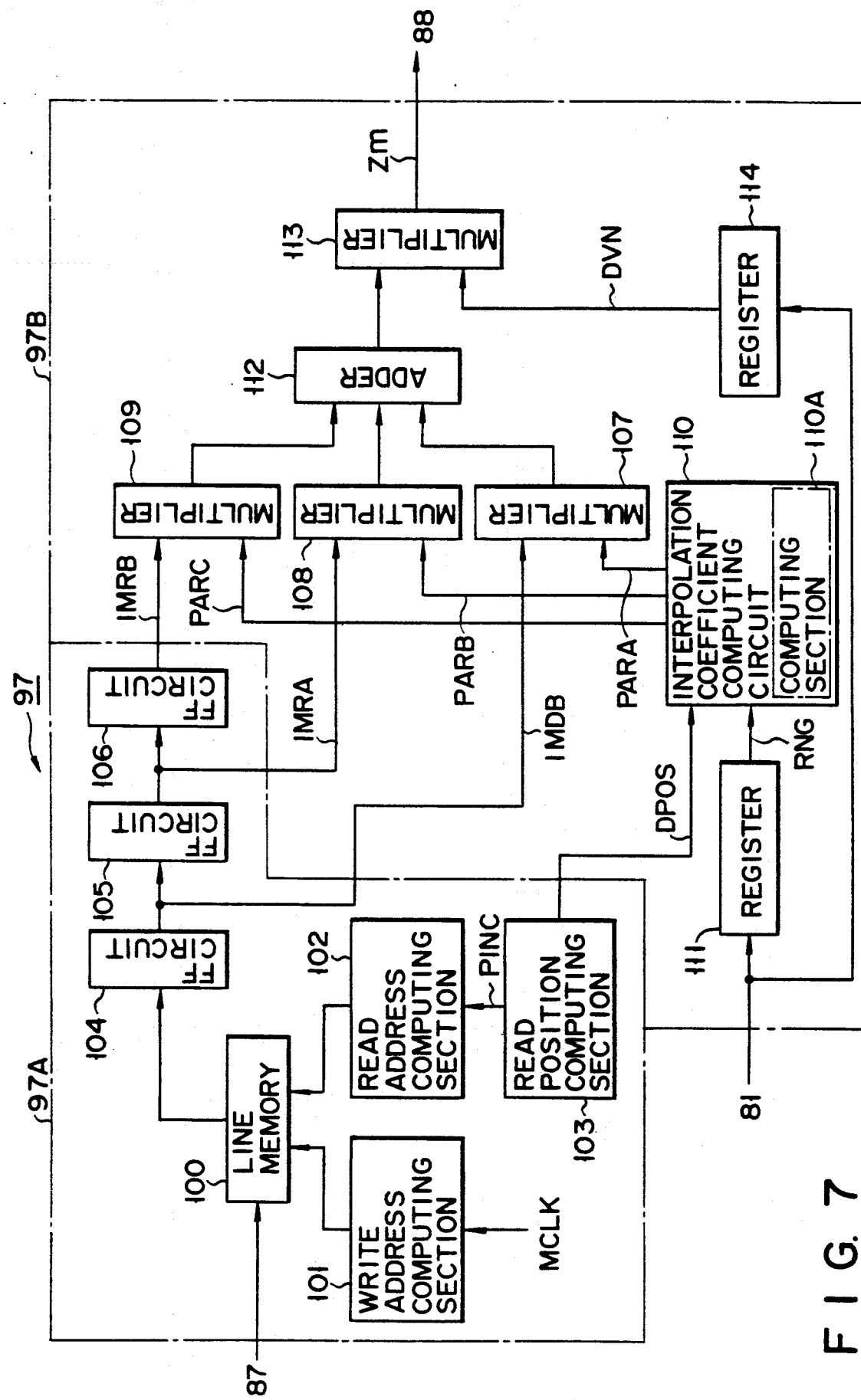
FIG. 7 is a block diagram illustrating a magnification processor shown in FIG. 5.

FIG. 7 illustrates the magnification processor 97. This processor 97 comprises an image memory section 97A and a magnification change computing section 97B. The former section 97A stores the density data (color signal) from the color signal converter 87 into a line memory 100 and reads out this data from the line memory. The latter section 97B processes the density data read out from the line memory 100.

The line memory 100 has a memory capacity of two lines (one line=5k×12 bits) and is designed such that already-written data can be read out while one of line data is being written.

A write address computing section 101 produces write address signal for the line memory 100 in accordance with a main clock signal MCLK; density data is written in the line memory 100 in accordance with this write address signal.

Figure 8:
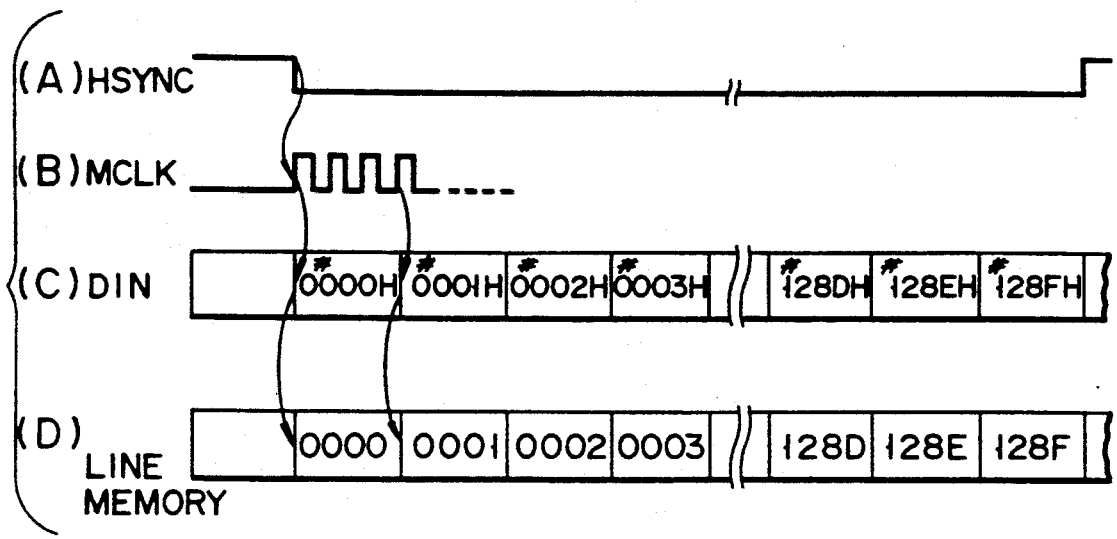
FIGS. 8A and 8B are timing charts for explaining the operation of an image memory section shown in FIG. 7.
FIGS. 8C and 8D are diagrams for explaining the operation of the image memory section shown in FIG. 7.

FIG. 8 illustrates the relation between the main clock signal MCLK and input density data DIN. With three pulses of the main clock signal, one piece of density data is written in the line memory 100.

A read address computing section 102 produces a read address signal for the line memory 100. A read position computing section 103 computes the position of an input pixel corresponding to the center of an output for each 1-dot output in the units of length, $2^{-10}$ times the input pixel pitch.

Figure 9:
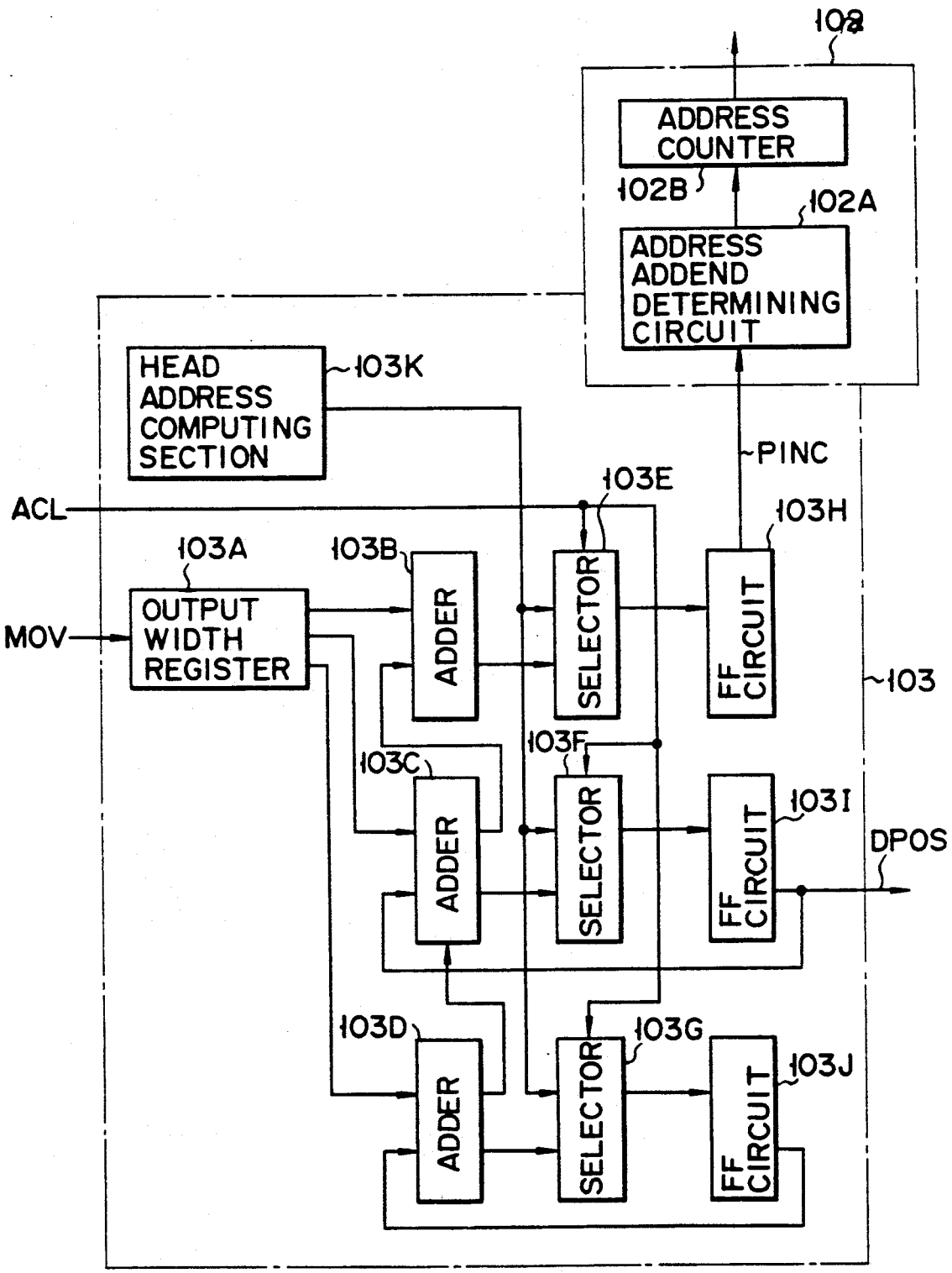
FIG. 9 is a block diagram illustrating part of the image memory section shown in FIG. 7.

FIG. 9 illustrates the read address computing section 102 and read position computing section 103.

The latter computing section 103 comprises an output width register 103A, adders 103B, 103C and 103D, selectors 103E, 103F and 103G, and flip-flop (FF) circuits 103H, 103I and 103J.

The output width register 103A is set with a pixel read pitch MOV corresponding to a copying magnification output from the main controller 81. This 12-bit read pitch MOV is determined by the following equation:

$$MOV = 400H + \text{magnification coefficient} + \text{copying magnification}.$$

The magnification compensating coefficient is for compensating for solid errors of an optical system, such as the scanner 3, and the image forming section 4; its idealistic value is "1". The copying magnification is set through the operation panel 50, and is "1" for a 100% magnification. With the magnification compensating coefficient having the idealistic value of "1" and the copying magnification being 100%, MOV is set to "400"H. For the magnification compensating coefficient being "1" and the copying magnification being 400%, then MOV="100"H. Further, for the magnification compensating coefficient being "1" and the copying magnification being 50%, MOV="500"H.

The adder 103B adds an integer portion of the read pitch MOV to a carry signal from the adder 103C. The integer portion represents an upper 2-bit of the read pitch MOV. The adder 103C adds 4-bit data below the decimal point of the read pitch MOV to output data of the FF circuit 103I. The adder 103D adds data of the least significant bit, 6th bit, of the read pitch MOV to output data of the FF circuit 103J.

The selectors 103E-103G selects one of the output data of the adders 103B-103D and a line head address stored in a register 103K in accordance with a read address clear signal ACL. The output data of these selectors 103E–103G are stored in the FF circuits 103H-103J, respectively. The data stored in the selectors 103H-103J represent a present read address. The integer portion PINC output from the FF circuit 103H is supplied to the read address computing section 102, and 4-bit data DPOS below the decimal point of the decimal portion output from the FF circuit 103I is supplied to an interpolation coefficient computing circuit 110 to be described later.

The read address computing section 102 computes the read address of the line memory 100 based on the integer portion PINC output from the FF circuit 103H. This circuit can read data zero to two times within a 3-pulse period of the main clock signal MCLK.

The read address computing section 102 comprises an address addend determining circuit 102A for determining an address addend based on the integer portion PINC and an address counter 102B for counting the read address of the line memory 100 in accordance with the output of this determining circuit 102A.

The former determining circuit 102A sets the address addend to "0" when PINC=0, and does not vary the read address. Since no address is updated in the address counter 102B for two read timings, new data is not read out from line memory 100.

When PINC=1, the address addend determining circuit 102A sets the address addend to "1" at the first one of the two read timings and sets the value to "0" at the second read timing. Therefore, the address counter 102B increments the address by "1" at the first read timing to read new data from the line memory 100 and reads no data at the second read timing.

With PINC=2, the determining circuit 102A sets the address addend to "1" at both of the two read timings. The address counter 102B therefore increments the address by "1" at both read timings to read new data from the line memory 100.

With PINC=3, the determining circuit 102A sets the address addend to "2" at the first read timing and to "1" at the second read timing. The address counter 102B therefore increments the address by "2" at the first read timing to read new data from the line memory 100 and increments the address by "1" at the second read timing to also read new data from the line memory 100.

When the read address is negative, the read address of the line memory 100 is "0" and output data is masked while such event is taking place.

FIGS. 10A-10D exemplifies the value of the PINC output from the FF circuit 103H and the address output from the address computing circuit 102.

Figure 10:
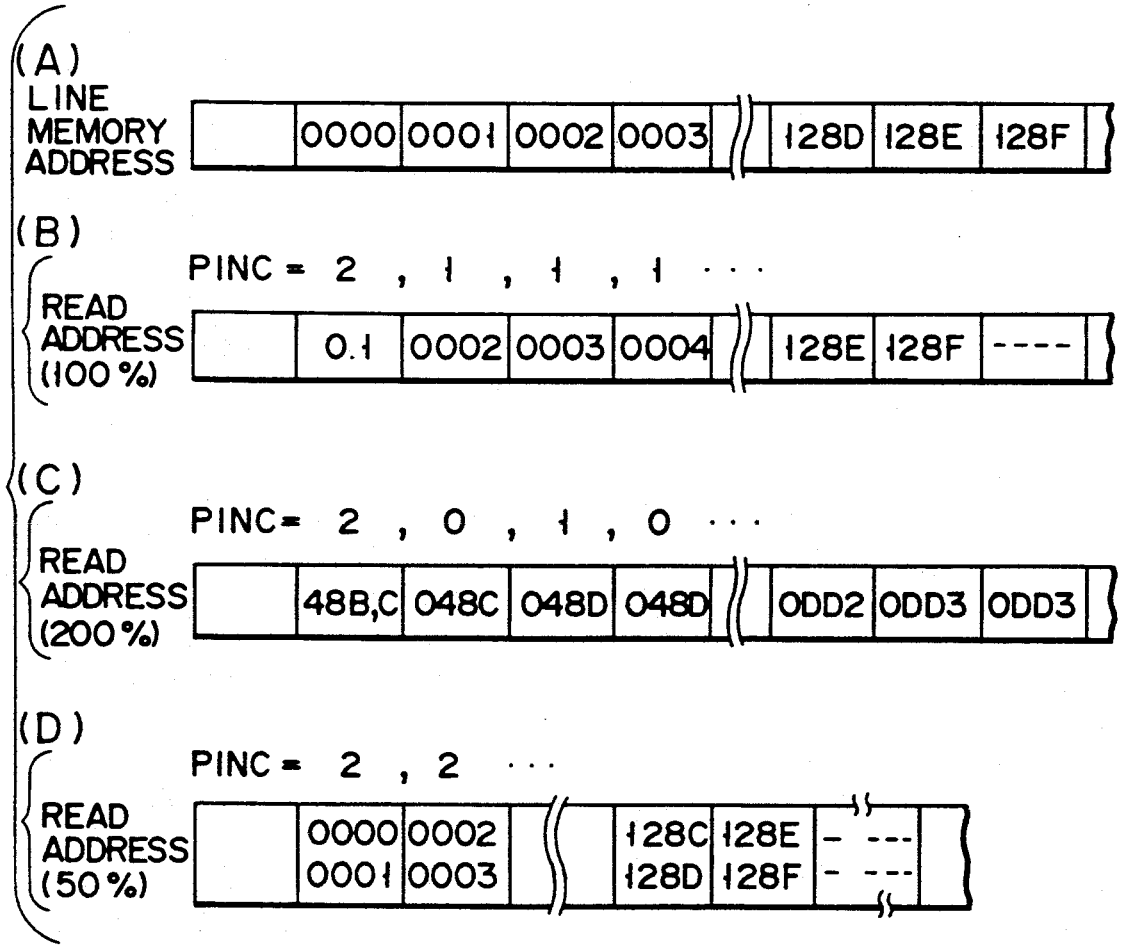
FIGS. 10A-10D are diagram for explaining the read operation of a line memory shown in FIG. 7.

In a case where the address is set in the line memory 100 as shown in FIG. 10A with the copying magnification being 100%, the values of the PINC from the FF circuit 103H are set to be 2, 1, 1, 1, . . . , as shown in FIG. 10B. Accordingly, data at the addresses "0,1" are read out first from the read address computing circuit 102, followed by data at addresses "2, 3, 4, . . . "

With the copying magnification being 200%, the values of the PINC for the FF circuit 103H are set to "2, 0, 1, 0, . . . " as shown in FIG. 10C. Accordingly, data at the addresses "48B, 48C" are first read from the address computing circuit 102, followed by data at the addresses "48C, 48D, 48D, . . . "

With the copying magnification being 50%, the values of PINC from the FF circuit 103H are set to "2, 2, . . . " as shown in FIG. 10D, and data at the addresses "0, 1" are read out from the address computing circuit 102, followed by data at addresses "2, 3".

The density data read out from the line memory 100 in accordance with the copying magnification set is sequentially stored in FF circuits 104-106 shown in FIG. 7.

The magnification change computing section 97B, in principle, processes density data stored in the FF circuits 104-106 using a linear interpolation method in case of the copying magnification being 100% or greater, i.e., in case of making enlarged copies, and processes the density data using a projection method in case of making reduced copies.

In other words, the magnification change computing section 97B computes the density data Zm according to the copying magnification based on the following equation (1).

$$Zm = (PARA \times IMDB + PARB \times IMRA + PARC \times IMRB) \times DVN + 800H \quad (1)$$

$$DVN = 800H + DVN$$
$$= 800H + (PARA + PARAB + PARC)$$

The density data is processed by the linear interpolation method as follows.

Figure 11A:
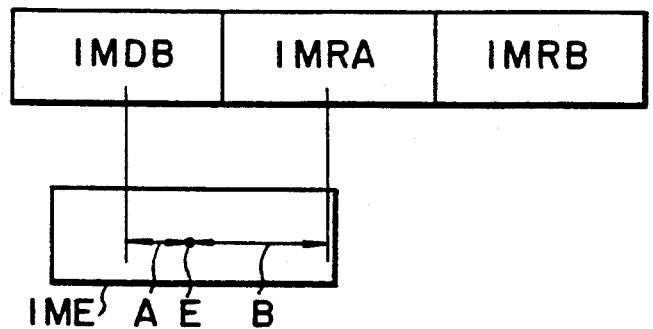
FIGS. 11A and 11B are diagrams for explaining a linear interpolation method.
Figure 11B:
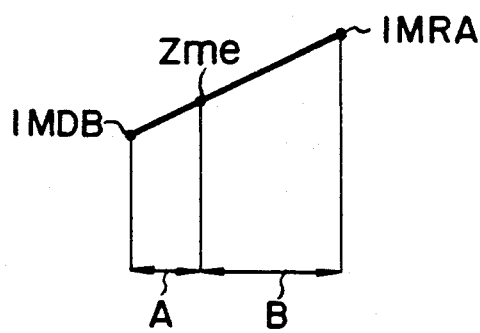

As shown in FIGS. 11A and 11B, in a case where the read center position of pixel data IME after enlargement with respect to density data IMDB, IMRA and IMRB of an original pixel is E, given that A represents the distance between the center E of the pixel IME and the center of the original density data IMDB including that center position E, and B represents the distance between the center E of the pixel data IME and the center of the density data IMRA adjacent to the density data IMDB the density Zme of the pixel data IME is expressed by equation (2) which is the equation (1) modified:

$$Zme = (B \times IMDB + A \times IMRA) + (A + B) \quad (2)$$

$$A + B = 10H \ (= RNG)$$

$$PARA = B \ (= DPOS)$$

$$PARB = A$$

$$PARC = OH$$

Through the above computation, density data lost in quantization can be subjected to linear interpolation according to the enlarged magnification.

Figure 12:
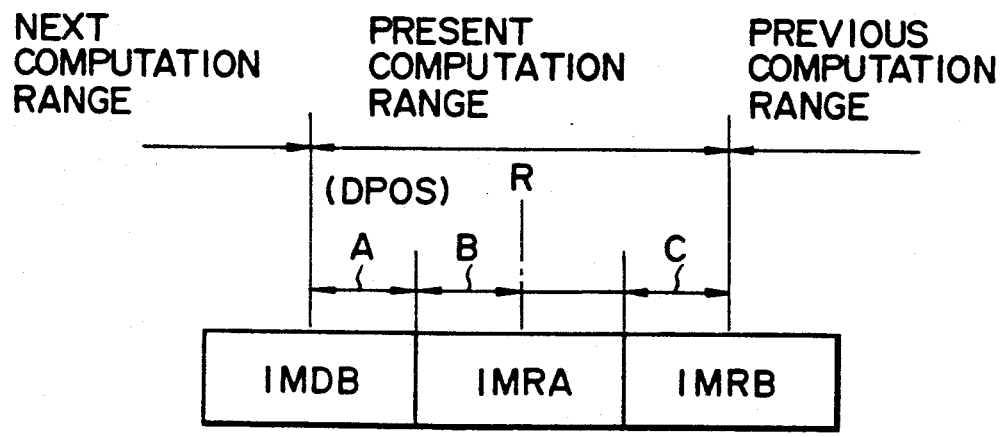
FIG. 12 is a diagram for explaining a projection method.

Processing of density data using the projection method is executed as follows. As shown in FIG. 12, in a case where the read center position of pixel data after size reduction, with respect to density data IMDB, IMRA and IMRB, of an original pixel is R, given that B represents the distance from the center position R to a boundary between the original density data IMRA including that center position R and adjacent density data IMDB, A represents the distance between the boundary and the center of the density data IMDB, and C represents the distance from a boundary between the density data IMRA and adjacent density data IMRB to the center of the density data IMRB, the density Zmr of the pixel data IMRD is expressed by equation (3) which is the equation (1) modified:

$$Zmr = (A \times IMDB + B \times IMRA + C \times IMRB) \div (A + B + C) \quad (3)$$

$$A + B + C = RNG \ (= 10H + magnification)$$

$$PARA = A \ (= DPOS)$$

$$PARB = B$$

$$PARC = C$$

Through the above computation, density data in a reduced magnification can be obtained.

The magnification change computing section 97B performs the above computation on the density data IMDB, IMRA and IMRB output from the FF circuits 104–106 to produce density data according to the set computing magnification.

More specifically, multipliers 107–109 of the magnification change computing section 97B multiply the density data IMDB, IMRA and IMRB from the FF circuits 104–106 by parameter data PARA, PARB and PARC from the interpolation coefficient computing circuit 110, respectively.

The computing circuit 110 has a computing section 110A which computes parameter data PARA, PARB and PARC for the linear interpolation method or projection method in accordance with the 4-bit DPOS below the decimal point supplied from the read position computing section 103 and the copying magnification output from the main controller 81 and set in the register 111. These parameter data are computed according to the conditions given in the Table 2 below.

TABLE 2

| Parameter | Set Value | Condition |
|---|---|---|
| PARA | RNG | DPOS ≧ RNG |
|  | DPOS | RNG > DPOS |
| PARB | 0 | DPOS ≧ RNG |
|  | RNG − DPOS | DPOS + 10H > RNG > DPOS |
| PARC | 0 | DPOS + 10H > RNG |
|  | RNG − DPOS − 10H | RNG ≧ DPOS + 10H |

As described above, RNG is computed by the main controller 81 according to the copying magnification and set in the register 111. For the linear interpolation method, RNG is set to be RNG = 10H (101% ~). For the projection method, RNG = 10H + copying magnification (50% ~ 100%).

The results of multiplication from the multipliers 107–109 are supplied to an adder 112 and added together there. The output signal of the adder 112 is supplied to a multiplier 113 which is also supplied with a dividend DVN from a register 114. The multiplier 113 multiplies the result of the addition by the value DVN to produce density data according to the copying magnification.

The dividend DVN is computed by the main controller 81 according to the copying magnification and is set in the register 114. The dividend DVN is obtained as follows:

$$DVN = 800H + RNG.$$

The density data produced according to the copying magnification in the above-described manner is supplied to the binary circuit 88. The binary circuit 88 performs an area gradation conversion using a dither method or the like, i.e., a binary operation, one of the density data Y, M, C or B from the magnification change computing section 97B. The resultant binary signal is supplied to the thermal head controller 93.

The thermal head controller 93 sends the received binary signal to the thermal head 30 which transfers the ink on the ink ribbon 31 onto a paper wound around the platen drum 25.

When the copy key 51 on the operation panel 50 is operated, a paper P in the feed cassette 20 is taken out by the feed roller 21 and is further conveyed by the conveying rollers 22 and resist rollers 23.

The paper P carried by the resist rollers 23 is guided via the guide 24 to the thermal head 25, and its fore end is securely held by the gripper 28.

Under this circumstance, the thermal head 30 transfers the ink on the ink ribbon 31 onto the paper P wound around the platen drum 25 in accordance with the binary signal supplied to the thermal head controller 93.

For a multi-color copy, the individual color signals from the color signal converter 87 are sequentially processed by the magnification processor 97 according to the copying magnification and are subjected to a binary operation in the binary circuit 88. Based on the binary density data, those inks of the ink ribbon 31 whose colors are associated with the density data are transferred onto the paper one upon another.

When copying a document image is completed, the main controller 81 turns off the lamp 6, and discharges the paper P which has been wound around the platen drum 25, thus completing the copying operation.

According to the above operation, the magnification processor 97 processes the density data corresponding to a color signal by the linear interpolation method when an enlarging magnification is set, and processes the data by the projection method when the reduced magnification is set. In either case, therefore, the density data is processed according to the set copying magnification, thus preventing occurrence of a moire, etc. and providing copies with a good-quality image.

The read position computing section 103 outputs 4 bits (DPOS) below the decimal point of the result of the position computation as a coefficient for interpolation and outputs integer portion (PINC) as the read position of density data This improves the accuracy of the read position according to the copying magnification and reduces the number of coefficients used in computing the density data, thereby resulting in simplification of the circuit arrangement.

What is claimed is:

1. An image forming apparatus for forming an image in accordance with a copying magnification, comprising:
    means for reading image data on a document in units of pixels, including density data;
    means for setting the magnification of an image to be formed;
    means for computing a density of pixels to be output from among those pixels which have been read by said reading means, in accordance with the magnification set by said magnification setting means, such that, when an enlargement magnification is set by the setting means, said computing means computes a density Zme of a pixel IME based on the equation:

$$Zme = (\times IMDB + A \times IMRA) + (A+B)$$

wherein IMDB and IMRA are adjacent pixels read by the reading means, IME is a pixel after enlargement with respect to the pixels IMDB and IMRA, A is a distance between a center of the pixel IME and a center of the pixel IMDB, and B is a distance between the center of the pixel IME and a center of the pixel IMRA, and when a reduction magnification is set by the setting means, said computing means computes a density Zmr of the pixel IME based on the equation:

$$Zmr = (A \times IMDB + B \times IMRA + C \times IMRB) + (A+B+C)$$

wherein IMDE, IMRA, and IMRB are adjacent pixels read by the reading means, IME is a pixel after reduction with respect to the pixels IMDB, IMRA, and IMRB, B is a distance from the center portion of the pixels IMDB, IMRA, and IMRB to a boundary between the pixel IMDS and the pixel IMRA, A is a distance between the boundary and the center of the pixel IMDB, and C is a distance from a boundary between the pixel IMRA and the adjacent pixel IMRB to the center of the pixel IMRB; and means for forming an image by using the pixels computed by the computing means.

2. An apparatus according to claim 1, further comprising:
   means for storing pixels read by said reading means;
   means for reading out pixels from said storage means, in accordance with the magnification set by said magnification setting means; and
   means for holding a plurality of pixels read out from said storage means.

3. An apparatus according to claim 2, wherein said readout means comprises:
   first producing means, for producing read position data including an integer portion and a decimal portion based on the pitch of a pixel to be output; and
   second producing means, for producing a read address of said storage means, using the integer portion of the read position data produced by said first producing means.

4. An apparatus according to claim 2, wherein said computing means comprises:
   means for calculating a plurality of coefficients in accordance with the magnification set by said magnification setting means;
   means for multiplying the plurality of coefficients from said calculating means by a plurality of pixels held in said holding means;
   means for adding an output of said multiplying means; and
   means for dividing an output of said adding means by a predetermined value.

5. An apparatus according to claim 4, wherein said image forming means comprises means for transferring ink onto paper, in accordance with the computation result obtained from said computing means.

6. An image forming method for forming an image in accordance with a given copying magnification, and comprising the steps of:
   (1) reading image data on a document in units of pixels;
   (2) storing pixels read in step (1) in a memory;
   (3) setting the magnification of an image to be formed;
   (4) computing read position data including an integer portion A and a decimal portion B, and indicating the read position of said memory, in accordance with the magnification set in step (3);
   (5) outputting as a coefficient X a smaller one of said decimal portion B of the read position data obtained in step (4) and a pixel pitch C read in step (1);
   (6) outputting a predetermined value when a result of subtracting a value of said coefficient X from a predetermined coefficient D is negative, and outputting a smaller one of said subtracting result (D−X) and said pixel pitch C as a coefficient Y when said subtracting result is positive;
   (7) obtaining (D−X−Y), outputting a predetermined value when (D−X−Y) is negative and outputting (D−X−Y) as a coefficient Z when (D−X−Y) is positive;
   (8) executing a computation of $(\alpha \times X + \beta \times Y + \gamma \times Z)/D$, using pixels $\alpha$, $\beta$ and $\gamma$ sequentially read out from said memory, in accordance with said integer portion A of said read position data computed in step (4) and said coefficients X, Y, and Z, executing the computation when a reduced magnification is set in step (3), executing the computation with D=C when a larger-than-predetermined magnification is set in step (3); and
   (9) forming an image by using the result of the computation performed in step (8).

* * * * *